United States Patent [19]

Faulstich et al.

[11] Patent Number: 4,708,544

[45] Date of Patent: Nov. 24, 1987

[54] MACHINE TOOL CONTROLLER

[75] Inventors: Ingo Faulstich, Ludwigsburg; Dieter Ulbrich, Abstadt, both of Fed. Rep. of Germany

[73] Assignee: Hermann Pfauter GmbH & Co., Ludwigsburg, Fed. Rep. of Germany

[21] Appl. No.: 867,914

[22] Filed: May 29, 1986

[30] Foreign Application Priority Data

May 29, 1985 [DE] Fed. Rep. of Germany ....... 3519132

[51] Int. Cl.$^4$ .............................................. B23F 5/00
[52] U.S. Cl. .................................... 409/12; 364/474; 409/11; 409/15; 409/26
[58] Field of Search .................. 409/11, 12, 15, 26, 409/51; 51/9 J, 6 H, 2 AA, 287; 364/474, 170; 318/632, 572

[56] References Cited

U.S. PATENT DOCUMENTS

| 4,253,050 | 2/1981 | Angst | 409/12 |
| 4,368,412 | 1/1983 | Inoue | 318/632 |
| 4,449,546 | 2/1985 | Kuga et al. | 364/170 |
| 4,514,813 | 4/1985 | Nozawa et al. | 364/474 |
| 4,516,211 | 5/1985 | Nozawa et al. | 364/474 |
| 4,585,377 | 4/1986 | Nozawa et al. | 409/15 X |

FOREIGN PATENT DOCUMENTS

| 37284 | 3/1977 | Japan | 409/12 |
| 51-185 | 4/1977 | Japan | 409/11 |
| 149129 | 9/1983 | Japan | 409/11 |
| 666016 | 6/1979 | U.S.S.R. | 409/11 |

*Primary Examiner*—William R. Briggs
*Attorney, Agent, or Firm*—Schwartz, Jeffery, Schwaab, Mack, Blumenthal & Evans

[57] ABSTRACT

The method is used for measuring and/or controlling the position of a rotating reference element of a machine tool as a function of the position of a rotating main guide element. The two elements execute a basic movement with a transmission ratio which is constant in the ideal case. From the elements executing the basic movements pulse sequences are derived and their frequencies are made equal. The reference element executes an additional movement which, compared with the basic movement, occurs slowly and is predetermined as a function of the position of another moving element. To superimpose the additional movement, at least one of the signals describing the basic movement is shifted in phase relative to the reference element and a phase comparison is executed between the signals obtained, in such a manner that the resolution of the phase shift is distinctly finer than the distance between adjacent pulses of the signals derived from the main guide element and from the reference element.

25 Claims, 8 Drawing Figures

MACHINE TOOL CONTROLLER

BACKGROUND OF THE INVENTION

The invention relates to a method and apparatus for controlling the position of a rotating element of a machine tool.

For example, in the production of helical gearings on workpieces by hob peeling, the axes of the workpiece and of the tool cross each other and the workpiece and the tool rotate about their axes. The tool or the workpiece is moved at a feed rate parallel to the workpiece axis. During this process, the workpiece or the tool is given a corresponding additional rotation for generating the pitch of the helix.

In the hob peeling described the tool is joined to a main guide element, the spindle, and the workpiece is joined to a reference element, the workpiece spindle. The movement of the tool to be carried out during machining is composed of two relative movements consisting of a continuous indexing movement and a helical movement. The indexing movement consists of the tool and the workpiece rotating at rates which are inverse ratios of their numbers of teeth. The helical movement is produced by the tool or the workpiece being shifted in the direction of the workpiece axis and the workpiece executing an additional rotation relative to the tool. The following relation holds good for this helical movement when using a spur-toothed tool:

$$\Delta \zeta \cong \frac{\tan \beta}{r} \cdot \Delta z \quad (1)$$

Here $\Delta \zeta$ is the additional angle of rotation referred to the workpiece spindle of a cutting machine, $\Delta z$ is the displacement of the tool or of the workpiece in the direction of the workpiece axis, $\beta$ is the helix angle of the toothing of the workpiece and r is the pitch circle radius of the workpiece toothing. Considering the conditions after one rotation of the workpiece in each case, for example, a $\Delta \zeta = 0.0024$ is obtained for $\Delta z = 0.2$ mm, $\beta = 20°$, r=30 mm. This results in $\beta \zeta / 2\pi = 0.00039$, which means that in this example the basic rotation is approximately 2,560 times faster than the additional rotation. In general, as also in this example, the additional movement is slow compared with the basic movement.

If the movements are implemented via mechanical gear trains in the cutting machine, the deviations in transmission of the gear trains are significant in determining the machine characteristics. Thus, a measurement is required. If, in contrast, the movements are to be generated via individual drive mechanisms in combination with electronics, the measurement is a prerequisite for the movements to be produceable at all.

Normally, these measurements are based on the principle that a moving part is selected as a reference element and the instantaneous nominal position of this reference element is calculated from the instantaneous position of the remaining parts, taking into account the deviation-free transmission ratios to the reference element. The calculated nominal position is compared with the actual value. The result of this comparison is the measurement value. It can be used for correcting the instantaneous position of the guided part.

In the case of hob peeling, during each revolution of the workpiece, the tool machines a narrow strip of the flanks of the toothing to be produced. As a result of the superimposed helical movement, the narrow strip is threaded along the basic workpiece body and thus the toothing is produced over the entire width of the tooth trace. Accordingly, the helical movement produces the toothed face on the workpiece. Disregarding tooth trace modifications in which the tooth traces are intended not to be exactly helical lines, in order to improve the running characteristics of the finished toothed wheels in the gear mechanism, the ideal tooth trace of a cylindrical gear is a helical line.

To be able to produce this helical line as accurately as possible, the resolution of the measurement values used for determining the additional rotation for generating the helical line must not be too coarse. If the resolution of the measurement value for detecting the additional rotation is too coarse, the desired helical line is approximated by a stepped space curve during the measurement or during the controlling process. In the case of machines for machining workpieces having a diameter of, for example, 200 mm, a resolution of 0.5 /$\mu$m is desirable. This would mean that a pulse transmitter on the workpiece spindle of the cutting machine, if necessary followed by an interpolator, would have to supply approximately 600,000 pulses per spindle rotation. Although such pulse transmitters are known, they can only be used at a low number of revolutions or speed. The highest permissible number of revolutions of such pulse transmitters is at present about 50 to 100/min. But the spindles of the cutting machine should be able to operate at numbers of revolutions above 1,000/min. This excludes the methods using pulse scales, used at present for measuring the position of elements moving relative to each other.

It has already been mentioned that the tooth traces of cylindrical gears should in some cases not be exactly helical lines, in order to improve their running characteristics in the gear mechanism. It is possible to produce such gears by hob peeling by producing, for example, the right-hand and left-hand flanks in separate work cycles. During this process, the above-mentioned additional rotation is not proportional to the displacement of the tool or of the workpiece in the direction of the workpiece axis but the desired tooth-trace modification is superimposed on this additional rotation as a function of the axial slide position.

SUMMARY OF THE INVENTION

One object of the present invention is to provide a method and apparatus for measuring the position of a first moving element relative to the position of another moving element or relative to the position of several other elements with high resolution and accuracy even at high speeds and even with a transmission ratio which is not constant.

Another object of the present invention is to provide a method and apparatus for controlling the position of the first moving element based on its measured position.

The difficulties in achieving this object are the result of the fact that a high resolution of the measurement signal is required with high numbers of revolutions or speeds.

In the method according to the invention, the resolution of the pulse sequences from public transmitters establishes the measuring point spacing after matching of the frequencies; the resolution of the measurement value is independent of this. The resolution of the measurement value, for example in an analog phase measurement, is equal to the resolution achieved with the phase displacement. Since one signal is shifted in phase in such a manner that the resolution of the phase shift is considerably finer than the distance between adjacent pulses of the phase-shifted signal, signal transmitters with relatively coarse resolution can be used for detecting the rotations of the two elements. For example, pulse transmitters which, instead of the required 600,000 pulses per revolution, supply, for example, only 10,000 or 20,000 pulses can be used. As a result, devices having spindles which can have numbers of revolutions of several thousand per minute can be used. As a result of the phase shift, a fine resolution of the measurement value is achieved so that, in spite of the high numbers of revolutions of the spindles of the device, the relative position of the moving elements with respect to each other can be measured with high accuracy and, if necessary, can be controlled to the required value.

For generating the phase displacement, the device according to the invention is provided with a further drive mechanism by means of which the relative movement between the scanning device and the signal scale of the signal transmitter is generated. The signal for the reference element, modified by the relative movement between the scanning device and the signal scale, is supplied to the phase meter which also receives the signal generated by the signal transmitter of the drive mechanism for the main guide element. At the output of the phase meter, the measurement signal is then present which can be used, for example, for controlling the drive mechanism for moving the reference element.

In the device according to the invention the signals generated by the signal transmitters for detecting the movements of all guide elements are finely resolved by the elements for matching the resolution, are combined and the phase-shifted signal is formed. A phase measurement is then carried out between this signal and the signal derived from the movement of the reference element.

Also, according to the invention, the further drive mechanism used for executing the additional movement of the reference element is used for the additional movement of the reference element. In this arrangement, the further signal transmitter generates the corresponding actual values which are compared with the predetermined setpoint in the comparator. The output signal of the comparator is then used for controlling the further drive mechanism. As a result, the additional movement can be maintained very accurately so that the desired helical line can be produced with high accuracy on the workpiece.

In the device according to the invention, the signal generator is provided from whose signal the setpoint signals provided for the movements of the two elements are generated. The movements of the elements themselves are detected with relatively coarse resolution by the signal transmitters and are compared with the respective setpoint via phase meters. The result of the phase measurement is the measurement value; it can be used for controlling the position of one of the elements.

In the device according to the invention, a phase measurement between the signals supplied by the adder and by the signal transmitter of the drive mechanism for the reference element is carried out in the phase meter. At the output of the phase meter the required signal is then present, but with a resolution which is too coarse. The resolution section located between the adder and the further signal transmitter ensures that the resolution is brought to a suitable value. In the adder, the output signals of the phase meter and of the resolution section and then combined. The required measurement value is then available with adequate resolution at the output of the adder.

The method and apparatus according to the invention can be used for detecting higher-frequency components of movement, for example, higher-frequency oscillations, with a particularly simple measuring technique.

In the method according to the invention, no additional pulses of the type occur which would suddenly change the transmission between the moving elements and thus result in a coarse resolution of the measurement value. The generation of the measurement signal is not tied to constant transmission ratios between the moving elements so that the method according to the invention and the devices according to the invention can be used for virtually any variable transmission ratios.

Other features of the invention are found in the further claims, the description and the drawings.

BRIEF DESCRIPTION OF THE DRAWINGS

The invention is explained in greater detail with the aid of some illustrative embodiments represented in the drawings, in which.

DETAILED DESCRIPTION OF THE PREFERRED EMBODIMENTS

Figure 1:
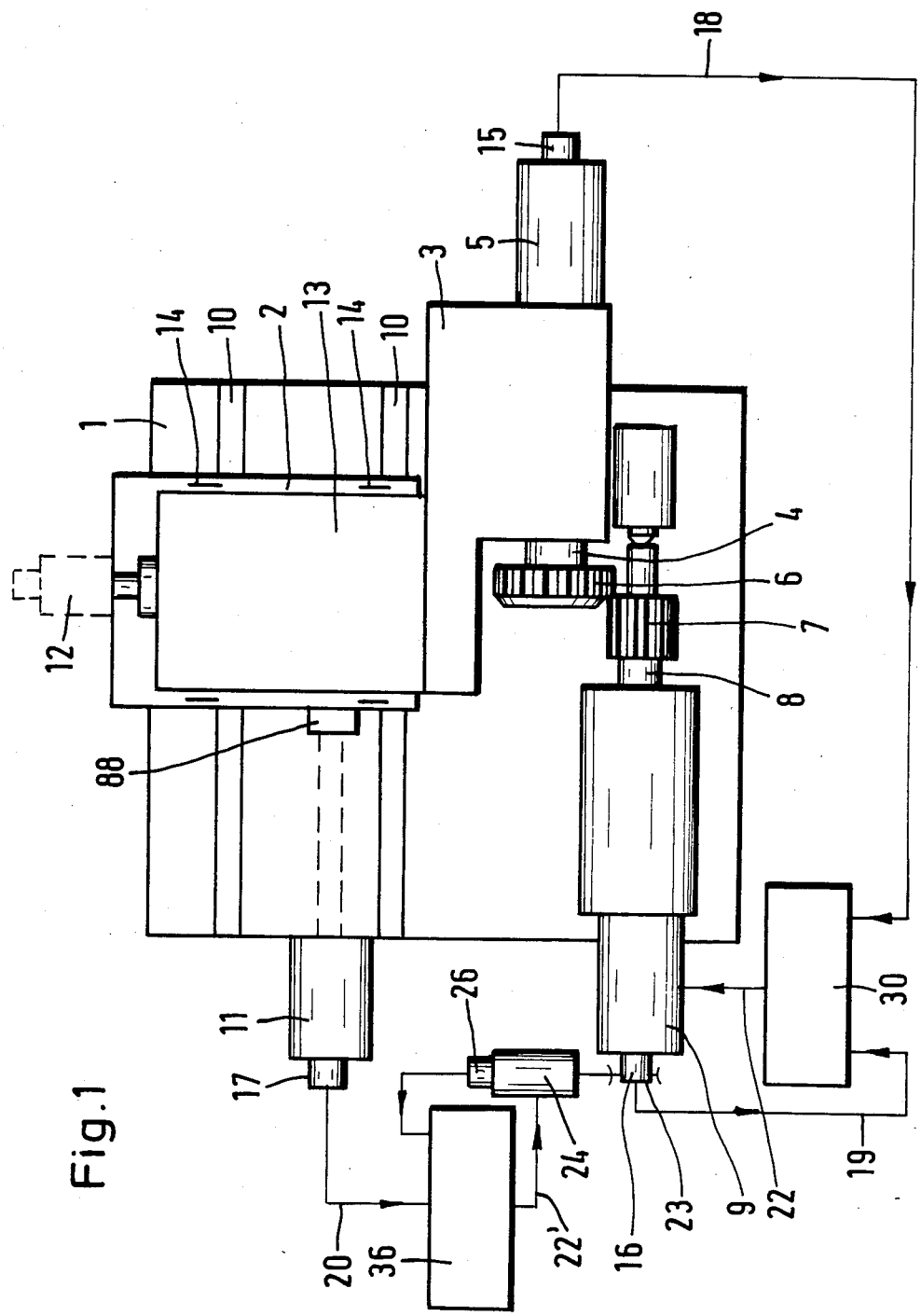
FIG. 1 shows a top view and diagrammatic representation of a device according to the invention for carrying out the method according to the invention.

FIG. 1 shows a cutting machine for gears. It has a machine bed 1 on which an axial slide 2, constructed as compound slide, can be moved. This can be used for adjusting a tool spindle unit 3. In this unit, a work spindle 4 is rotatably supported and is driven by a motor 5. On the work spindle 4, a tool 6 is seated which, in the illustrative embodiment, is a peeling wheel for producing toothing on a workpiece 7. The workpiece is seated on another spindle 8 which is driven by a motor 9. The tool 6 can be displaced by means of the axial slide 2 in the direction of the axis of the workpiece 7 along guides 10 on the machine bed 1 via a motor 11, mounted on the machine bed 1, and threaded drive 88. In addition, the tool 6 can be adjusted transversely to the axis of the workpiece 7. For this purpose, another motor 12 is provided as indicated with dashed lines in FIG. 1. By means of motor 12, the radial slide 13 can be displaced in guides 14 on the axial slide 2.

On the motors 5 and 9, pulse transmitters 15 and 16 are located, respectively. Pulse transmitters 15 and 16 are line-connected via lines 18 and 19, respectively, to a computer 30. In addition, the computer 30 is connected to the motor 9 via a control line 22.

The motor 11 is used to displace the axial slide 2 axially along the guides 10 during the machining, as a result of which the tool 6 is displaced along the workpiece 7 to be machined. The motor 12 is used for advancing the tool 6 to the desired extent towards the workpiece 7 before the machining. In the case of the cutting machine shown, the tool 6 and the workpiece 7 are rotated around their axes by the motors 5 and 9 in an inverse ratio to their numbers of teeth. The pulse transmitters 15 and 16 supply to computer 30 via lines 18 and 19 pulses corresponding to the respective number of revolutions of the work spindles 4 and 8. The angular positions of the work spindles in the required relationship to each other is produced in computer 30 on the basis of a pulse phase measurement.

To produce helical gearing on the workpiece 7, the workpiece 7 is provided with a corresponding additional rotation in the illustrative embodiment shown. This rotation can be positive or negative in relation to the working rotation of the workpiece 7, depending on the direction of the pitch of the helix. The setpoint for this additional rotation is generated by another motor 24 which initiates an additional rotation of the working spindle 8 via a rotation of the housing 23 of the pulse transmitter 16. Corresponding to this additional movement, a pulse transmitter 26 generates pulses which can be used for monitoring and, if necessary, correcting the extent of the additional rotation. The corresponding signals are then supplied to the motor 24 via a control line 22' from another computer 36.

The pulses of the pulse transmitter 17, by means of which the displacement of the axial slide 2 and thus the displacement of the tool 6 is detected, are supplied to the computer 36 via the line 20. This results in the adjusting signal supplied to the motor 24 via the line 22' taking into account the equation (1) and the signal of the pulse transmitter 26.

The additional movement can also be executed by the tool 6, which additional movement is then monitored and controlled in the same manner as described above for the additional movement of the workpiece 7.

Figure 2:
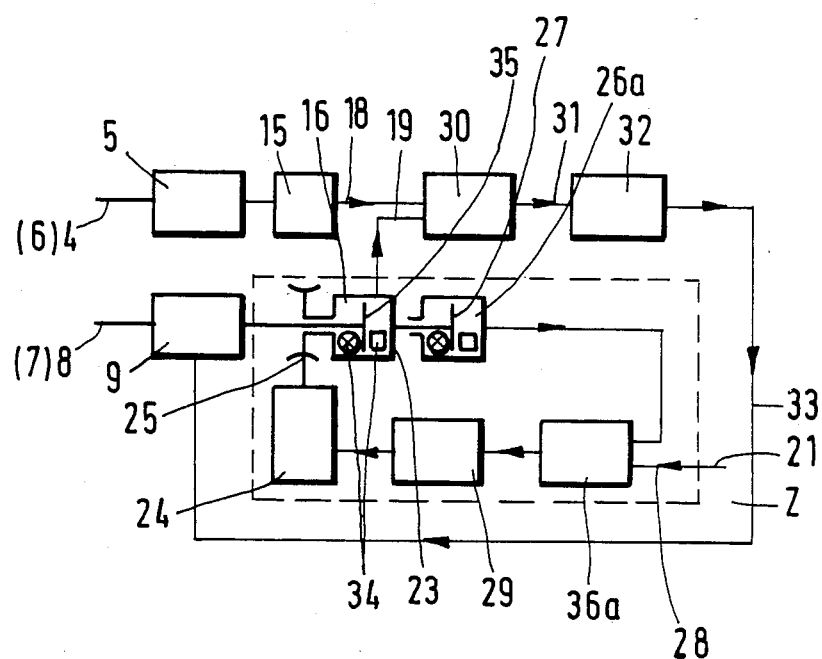
FIG. 2 shows a block diagram of a circuit used for carrying out the method according to the invention.

FIG. 2 shows a circuit diagram for a cutting machine in which, instead of the pulse transmitter 26, a pulse transmitter 26a is arranged coaxially to the pulse transmitter 16. The movements of the work spindles 4 and 8 are detected by the pulse transmitters 15 and 16. The pulse transmitter 16 is in the housing 23 which is rotatable table about its axis. As a drive mechanism, the additional motor 24 is provided and is drive-connected to the housing 23 via a gear mechanism 25 which is a worm gear in the illustrative embodiment. The rotational movement of the pulse transmitter housing 23 is detected by the pulse transmitter 26a. It is constructed in such a manner that its pulse scale 27 is connected rotationally rigidly to the housing 23. The signal derived from the pulse transmitter 26a is supplied to the computer 36a which, in addition, is provided with a signal input 28 for the setpoint of the additional movement. The signal derived from the signal transmitter 26a is compared with the setpoint of the additional movement in the computer 36a and thus the control error for the additional movement of the housing 23 is formed. This control error is amplified by a subsequent amplifier 29 and used for rotating the motor 24. Thus, a control is provided for the additional movement of the housing 23 of the pulse transmitter 16. The resolution of the pulse transmitters 15 and 16 can be coarse. But the resolution of the pulse transmitter 26a must be fine to obtain the desired helical line as free of steps as possible during the production of the helical gearing. But this is quite easily possible since the housing 23 of the pulse transmitter 16 is rotated only slowly by the motor 24. For this reason, a pulse transmitter can be used which supplies a very large number of pulses per revolution so that the desired fine resolution can be achieved without difficulty.

As is shown in FIG. 2, the signals derived from the pulse transmitters 15 and 16 are supplied to a computer 30 via lines 18 and 19. The pulse frequency of both signals is made equal via known elements, not shown, and a phase comparison is carried out between the pulse sequences obtained in this manner. The additional movement is then initiated by phase shifting. The result of the phase comparison is the required deviation of the workpiece 7 from its nominal angular position. The deviation is supplied by means of a corresponding signal via a line 31 to an amplifier 32 which then supplies the amplified signal via line 33 to the motor 9 for control purposes. Thus, the position of the workpiece 7 can be accurately controlled.

The phase shifting is achieved by slowly rotating the housing 23 of the pulse transmitter 16 about its axis by means of the motor 24. The required correcting variable for the motor 24 is obtained by the comparison of the actual value of the angular position of the housing 23 with the setpoint of the additional rotation present at the signal input 28 of the computer 36a. The scanning head 34 of the pulse transmitter 16 is mounted at the housing 23 so that this scanning head executes a movement relative to the pulse scale 35 of the pulse transmitter 16. As a result, the additional movement caused by the additional rotation of the pulse transmitter housing 23 is superimposed on the indexing movement of the workpiece 7 and is added to or substracted from the pulse sequence of the indexing movement of the workpiece, depending on the direction of rotation of the housing. The maintenance of the required rotation of the pulse transmitter housing 23 by the motor 24 is monitored and, if necessary, corrected in the manner described via the pulse transmitter 26a.

After the frequencies of the pulse sequences of the signal transmitters 15, 16 are matched in elements, not shown, the pulse sequences establish the measurement point spacing. The resolution of the measurement value, that is to say the signal resulting after the phase measurement, is equal to the resolution obtained with the phase shifting described, for example, in the case of an analog phase measurement. For this reason, pulse transmitters having a relatively coarse resolution can be used for detecting the indexing movement, for example, pulse transmitters which supply, for example, only 10,000 or 20,000 pulses per revolution of the work spindles 4 and 8. As a result, spindle revolutions of several thousand per minute can be managed without difficulty. The essential factor is that, in the method described, no additional pulses of the type occur which would suddenly change the transmission and, as a result, would cause a coarse resolution of the measurement value. The frequency of the signal components which can be detected in accordance with the method described above is greater by a factor of 2 to 3 powers of 10 than the frequency which can be detected by means of the known methods using pulse transmitters, in which pulses are counted and the counts are cyclically interrogated and compared with each other. In addition, the resolution of the measurement signals is greater in accordance with the method described here than with the known methods. For example, the pulse transmitters 15 and 16 on the two spindles 4 and 8 can each supply 20,000 pulses per spindle revolution. If it is assumed that the tool 6 has 50 teeth and the workpiece 7 has 40 teeth, a signal with a frequency of 300 kHz is obtained from the work spindle 4 of the tool 6 and a signal with a frequency of 375 kHz is obtained from the spindle 8 of the workpiece 7 with a tool speed of, for example, 900 rev/min. The resolution is matched in such a way that the pulse sequences derived from the two pulse transmitters 15 and 16 have the same frequency. Accordingly, both signals have a frequency of 75 kHz after matching, in the illustrative embodiment. The phase comparison is carried out between these signals matched in resolution. Purely mathematically, this provides the possibility of detecting vibrations up to a frequency of 37.5 kHz because the upper limit for the frequency of a signal component detectable by this method is half the frequency of the signals present at the inputs of the phase comparator. The following relation holds true for the case that the pulse transmitters 15 and 16 on the two spindles 4 and 8 supply in each case N pulses per spindle revolution:

$$f_M = \tfrac{1}{2} \frac{n_0 \cdot N \cdot GGT(z_0, z_2)}{z_2} = \tfrac{1}{2} \frac{n_2 \cdot N \cdot GGT(z_0, z_2)}{z_0}$$

Here $n_0$ is the speed of the tool spindle 4, $n_2$ is the speed of the workpiece spindle 8, $z_0$ is the number of teeth of the tool 6, $z_2$ is the number of teeth of the workpiece 7 and $GGT(z_0, z_2)$ is the greatest common divisor in $z_0$ and $z_2$.

As has been described with the aid of FIG. 1 and 2, the phase displacement is produced by introducing an additional relative movement between the pulse scale 35 of the pulse transmitter 16 and the spindle 8 and the scanning head 34. In this arrangement, it is fundamentally unimportant whether it is the pulse sequence derived from the movement of the workpiece 7 or the pulse sequence derived from the movement of the tool 6 which is shifted in phase. If the phase shifting is carried out on the pulse sequence derived from the movement of the workpiece 7, as described with the aid of FIG. 1 and 2, the required relative movement between the pulse scale 35 and the scanning head 34 is directly equal to the additional movement which is to be carried out by the workpiece 7.

If, in contrast, the additional relative movement is carried out on the pulse sequence derived from the movement of the tool 6, the required transmission ratio between the workpiece 7 and the tool 6 must be taken into account. In addition, the relative movement naturally has to have opposite signs in this case because the tool rotates in a direction opposite to the workpiece.

Figure 3:
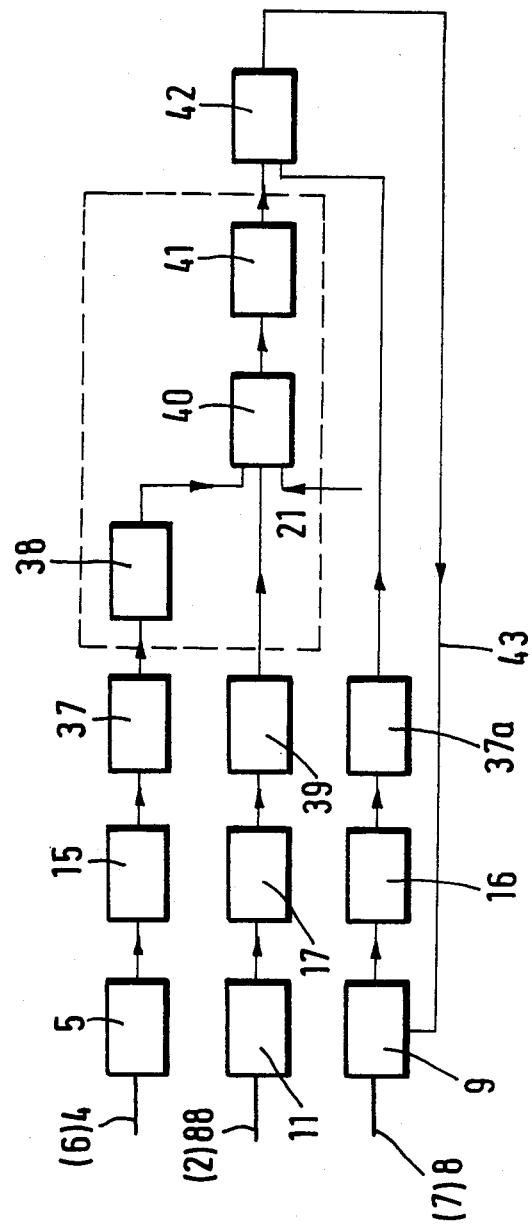
FIGS. 3, 4, 7 and 8 show block diagrams of embodiments of a circuit which are used for carrying out the method according to the invention.

The required phase displacement of one of the signals can also be achieved by electronic means. Such an illustrative embodiment is shown in FIG. 3. The spindle 4 of the tool 6 is associated with the pulse transmitter 15 and the spindle 8 of the workpiece 7 is associated with the pulse transmitter 16. The setpoint for the additional movement is derived from the signal supplied by pulse transmitter 17 as has been described with the aid of the illustrative embodiment according to FIGS. 1 and 2. The resolution of the pulse sequences generated by the pulse transmitters 15 and 16 is made equal in a known manner in devices 37, 37a. The device 37 is connected to a multiplier 38 by means of which the resolution set in the preceding device 37 is multiplied by a factor K. The pulse transmitter 17 is used for deriving a pulse sequence indicative of the additional movement. This pulse sequence has a resolution which is matched in device 39 to the required transmission ratio to workpiece 7 in such that the pulse spacing of the pulses emitted by the pulse transmitter 15 is, after matching in device 37, exactly 1/K times as large as the spacing of the pulses emitted by pulse transmitter 17 after matching in device 39. In an adder 40, which follows the multiplier, the pulses derived from the pulse transmitter 17 are added to or subtracted from the pulses derived from the pulse transmitter 15 after the respective matching. This signal is multiplied by the factor 1/K via a divider 41 which follows the adder 40. In this manner, the phase-shifted signal is obtained. The phase comparison between the displaced signal and the signal derived from the pulse transmitter 16 and also matched is carried out in a comparator 42 which follows the divider 41. For this purpose, the pulse transmitter 16 is connected via the device 37a to the comparator 42. The result of the phase comparison is the desired position correction value. It can be supplied via the control line 43 to the motor 9 which, as a result, can be corrected in simple manner. Additional movement of the motor 9 can be controlled by adding pulses at imput 21 of adder 40.

Using the method described with the aid of FIG. 3, it is also possible to use pulse transmitters which supply only a relatively small number of pulses per spindle revolution, for example, only 10,000 or 20,000 pulses, with a high speed of the spindles 4, 8 of several thousand revolutions per minute.

Figure 4:
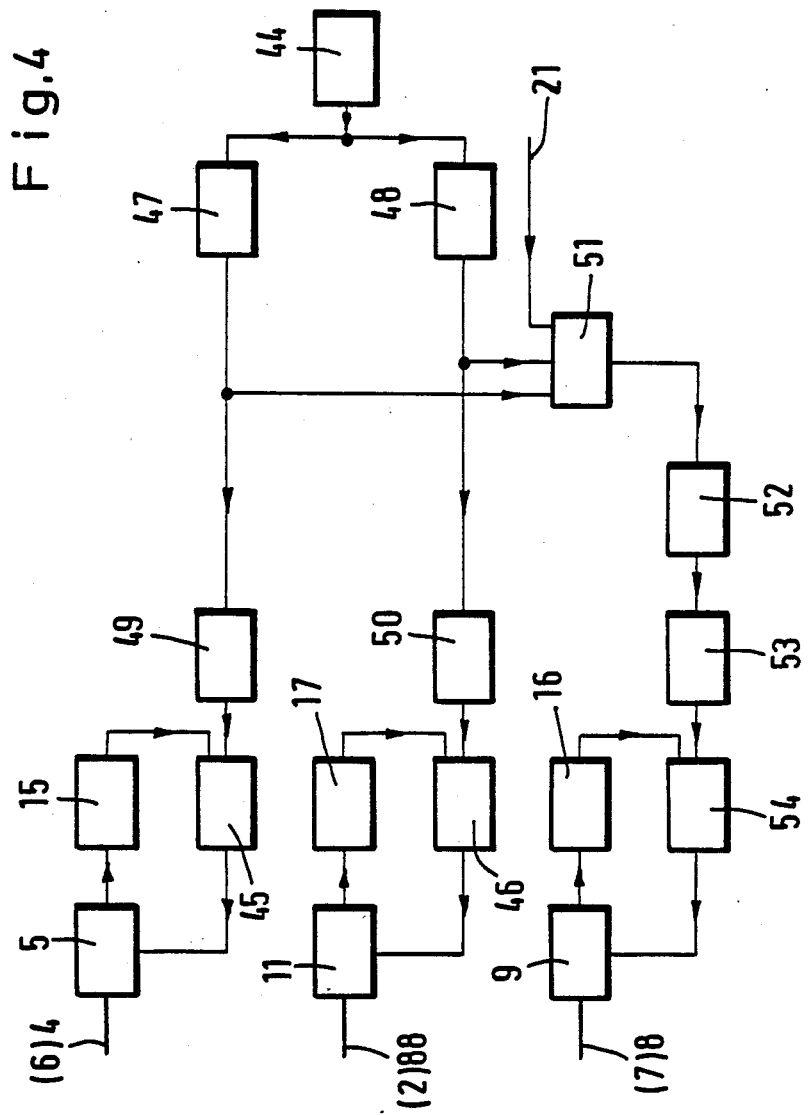

Another possibility of generating the desired phase displacement is explained with the aid of FIG. 4 in the text which follows. The spindle 4, and thus the tool 6 as the main guide element is driven by a generator 44 with a signal the frequency of which corresponds to the setpoint of the speed or number of revolutions of the tool 6. In the same manner, a second guide element and, if necessary, other guide elements can be supplied with a setpoint by the generator 44. In the illustrative embodiment shown, phase comparators 45 and 46 are supplied with these setpoints. The phase comparator 45 is allocated to the motor 5 for the spindle 4 of the tool 6 and the phase comparator 46 is allocated to the motor 11 for driving the axial slide 2. The pulses generated by the pulse transmitter 15 of the motor 5 are input as actual values to the phase comparator 45. Similarly, the pulses of the pulse transmitter 17 of the motor 11 are input as actual values to the phase comparator 46. Between the phase comparators 45 and 46 and the generator 44, the frequency of the generator is brought to the respective setpoint in two steps in the general case. The generator 44 is followed by two devices 47 and 48 by means of which the resolutions are made equal for the two phase comparators 45 and 46. The devices 47 and 48 are followed by dividers 49 and 50 which reduce the resolution by the factor 1/K. K must be selected to be such that the number of pulses supplied by the pulse transmitter 15, multiplied by K, supplies a sufficiently high resolution for the phase shifting. The signals modified in this manner are supplied to the phase comparators 45 and 46 as setpoints for controlling the position of elements 4 and 2.

Before the reduction by the factor 1/K by means of the dividers 40, 50, the signals from the devices 47, 48 are also supplied to an adder 51 which adds these signals with the correct signs. After matching of the resolution of a matching device 52, following the adder 51, a pulse sequence is available the frequency of which is equal to K times the nominal frequency of the movement of the workpiece 7. The matching device 52 is followed by a divider 53 which reduces the resolution of the signal describing the command variable by the factor 1/K. The set point for the movement of the workpiece 7 is then available. It is compared in a phase comparator 54 with the actual value of the rotation of the spindle 8 supplied by the pulse transmitter 16. This results in the required measurement value at the output of the phase comparator 54. This value can be used for controlling the motor 9 for the rotation of the workpiece spindle 8.

Figure 6:
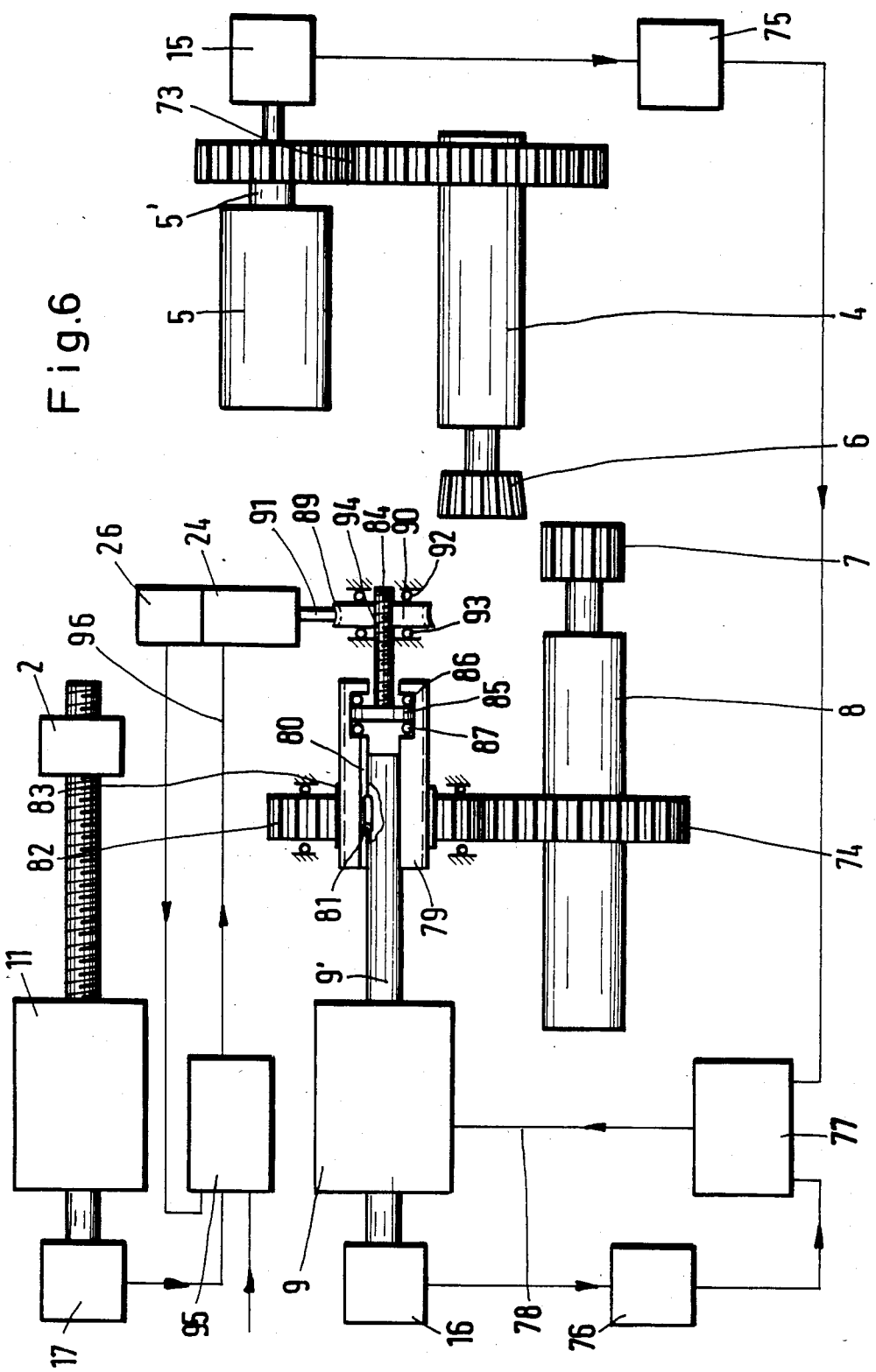
FIG. 6 shows a diagrammatic representation of another embodiment of a device according to the invention.

A significant advantage of the embodiments described consists in the fact that, given the high resolution and accuracy, the position of the workpiece can also be measured with a non-constant transmission ratio and, if necessary, can be controlled to a required value. The phase shifting can be carried out at the signal derived from the tool 6 or from the workpiece 7. In the phase shifting, modifications can also be taken into account, thus, for example, tooth trace modifications or torsional movements of the tool relative to the workpiece in the production of gears, to generate the right-hand and left-hand flanks of the workpiece in separate work cycles. As has been described with the aid of the illustrative embodiments, the necessary phase shifting can be carried out automatically by a control process. Similarly, it is possible to initiate the set point for the additional rotation wholly or partially manually or semi-automatically. This can be carried out, for example, by feeding pulses to input 21 (FIGS. 2–4, 7 and 8) by turning an electronic handwheel or by manually rotating the shaft 91 (FIG. 6). An electronic handwheel is a handwheel the rotation of which causes a pulse scale to be displaced relative to the scanning point and thus generates pulses.

In the illustrative embodiment according to FIG. 4, the signals are in each case divided down by a factor of 1/K in dividers 49, 50, 53. Naturally, these reductions can also be different in the various dividers. The deciding factor is only that the total transmission required in each case is available and the weighing of the pulses is equal before they are combined in the adder 51.

Figure 5:
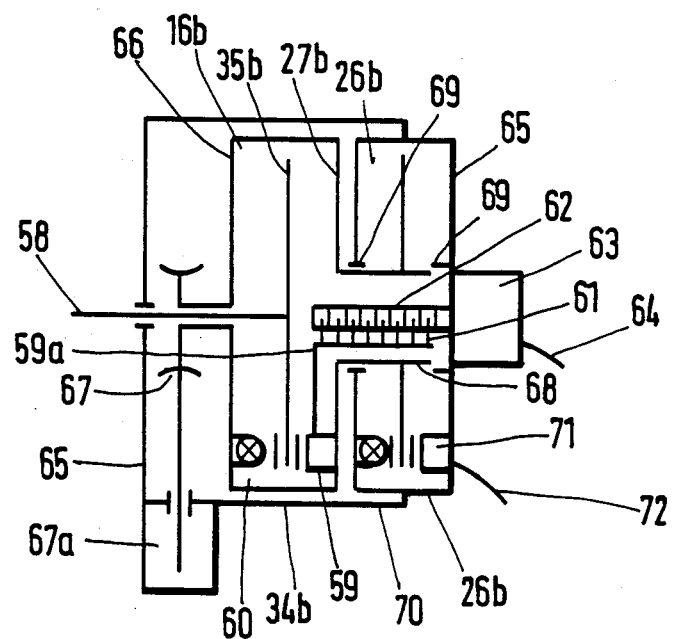
FIG. 5 shows a diagrammatic representation of a second embodiment of a signal transmitter of the device according to the invention.

FIG. 5 shows an illustrative embodiment of the device according to the invention. It shows the housing 65 into which a shaft 58 projects which can be coupled, for example, to the shaft of the motor 9. At the free end it carries the pulse scale 35b. On each side of the pulse scale, a photocell 59 and a light transmitter 60 are located. Together, they form the scanning head 34b in known manner. The photocell 59 is connected via line 59a to slipring contacts 61 which act in conjunction with corresponding slipring countercontacts 62 of a slipring head 63. The pulses generated by the pulse transmitter 16b are transmitted via this slipring head via a line 64.

In the housing 65 of the pulse transmitter 26b, the housing 66 of the pulse transmitter 16b is rotatably accommodated. It can be driven rotatably about its axis by a motor 67a with a gear 67, for example, with a worm gear. The housing 66 contains the pulse scale 35b and the scanning head 34b of the pulse transmitter 16b. The housing 66 is connected to a hollow shaft 68 which is rotatably supported in bearings 69 of the housing 65. The hollow shaft 68 carries the pulse scale 27b which is constructed as a circular disk and on the two sides of which the light transmitter 70 and the photocell 71 are arranged in a known manner. The pulse transmitter 26b is used for generating the pulses produced during the additional movement by rotation of the housing 66 and are transmitted via line 72 which is connected to the photocell 71. As explained with the aid of FIG. 2, this signal can be compared with the setpoint of the additional rotation. The signal obtained during this comparison can be conducted to the motor 67a for controlling the additional movement. The motor 67a then generates the desired phase shift of the signal supplied by the pulse transmitter 60b by rotation of the housing 66.

The construction described of the pulse transmitters 16b and 26b which are coaxially located behind each other results in a compact and space-saving design. The slipring contacts 61 and countercontacts 62 are surrounded at a distance by the hollow shaft 68 as a result of which the constructional length of this unit can be kept small. This unit can also be used as a separate measuring instrument.

In the embodiment according to FIG. 6, the drive shafts 5' and 9' of the motors 5 and 9 are in each case connected via a toothed gear 73 and 74 to the work spindle 4 and the spindle 8 which carry the tool 6 and the workpiece 7. The motors 5, 9 are used for rotating the tool 6 and the workpiece 7 about their axes, that is to say they carry out the basic movement. The resolutions of the signals derived from the pulse transmitters 15 and 16 associated with the motors 5 and 9 are made equal to each other with known means in the matching devices 75, 76. In a phase comparator 77, which follows the matching devices 75 and 76, the phase comparison is carried out as a result of which the measurement signal of the basic movement is obtained. The measurement signal is supplied via a control line 78 to the motor 9 and used for controlling the angular position of the workpiece 7.

The spacing of the pulse sequences present at the output of the matching devices 75 and 76 is the measuring point spacing. Assuming an analog phase measurement, the resolution of the measurement value is almost zero, that is to say extremely fine.

The additional movement is superimposed on the basic movement of the workpiece 7. For generating the additional movement, a screw guide element 79 of essentially sleeve-shaped construction and having at its inside an axially extending groove 80 for a feather key 81 of the drive shaft 9' is located rotationally rigidly but axially displaceably on the drive shaft 9'. On its outside, the screw guide element 79 is provided with a screw guide, indicated with dashes, which is engaged by the toothed wheel 82 of the toothed wheel gear 74 with corresponding guide elements 83. The screw guide element 79 is provided with a threaded spindle 84 which has at its end a disk 85 which is axially unmovably but rotatably supported on both sides against bearings 86 and 87 in the screw guide element 79. The threaded spindle 84 projects from the screw guide element and is located coaxially with respect to the drive shaft 9'. The threaded spindle 84 is drive-connected via gear 89 to the motor 24. In the illustrative embodiment, the gear 89 is a worm gear drive with a worm wheel 90 which is seated on the threaded spindle 84 and which is engaged by a worm 91. The worm wheel 90 is axially unmovably rotatably supported in bearings 92 and 93. The worm wheel 90 has an internal thread 94 with which it engages the thread of the spindle 84. When the worm wheel 90 is placed into rotation with the motor 24, the threaded spindle 84, which is secured against rotation by elements not shown, is axially displaced depending on the direction of rotation of the worm wheel. Since the threaded spindle 84 is axially umovably supported via its end disk 85 in the screw guide element 79, it is correspondingly axially displaced on the drive shaft 9'. The feather key 81 prevents the screw guide element from rotating on the drive shaft 9'. However, since the toothed wheel 82 engages the screw guide of the screw guide element 79 with the guide elements 83, it generates an additional rotation of the toothed wheel 82 proportional to the axial displacement of the screw guide element 79. The additional rotation is transmitted to the workpiece 7 via the gear 74 and the spindle 8. The required rotation of the controllable motor 24 can be very easily achieved by known means. For example, the pulses supplied by the pulse transmitter 17 of the motor 11 for the axial displacement are conducted to a counter of a computer 95 and other pulses which can be derived, for example, from the movement of another element for generating the additional movement are conducted to another counter of the computer 95. The pulses supplied from the pulse transmitter 26 of the motor 24 for detecting the additional movement are conducted to an additional counter of the computer 95. For example, the counts are sampled after 5 ms in each case and the setpoint for the additional rotation is formed which is compared with the actual value. The difference is converted in a digital/analog converter into an analog signal which is the control error. It is supplied via control line 96 to motor 24 for control purposes.

The pulses supplied by the pulse transmitter 16 describe the angular position of the workpiece 7. The superimposed additional movement shifts these pulses in phase relative to the workpiece 7. The resolution with which this phase shift is obtained is the resolution of the additional movement. Since this additional movement takes place slowly, a sufficiently fine resolution can be easily obtained. It is virtually the resolution of the entire device. Thus, a very high resolution is obtained in spite of a possibly very high speed of rotation of the spindles 4 and 8.

Figure 7:
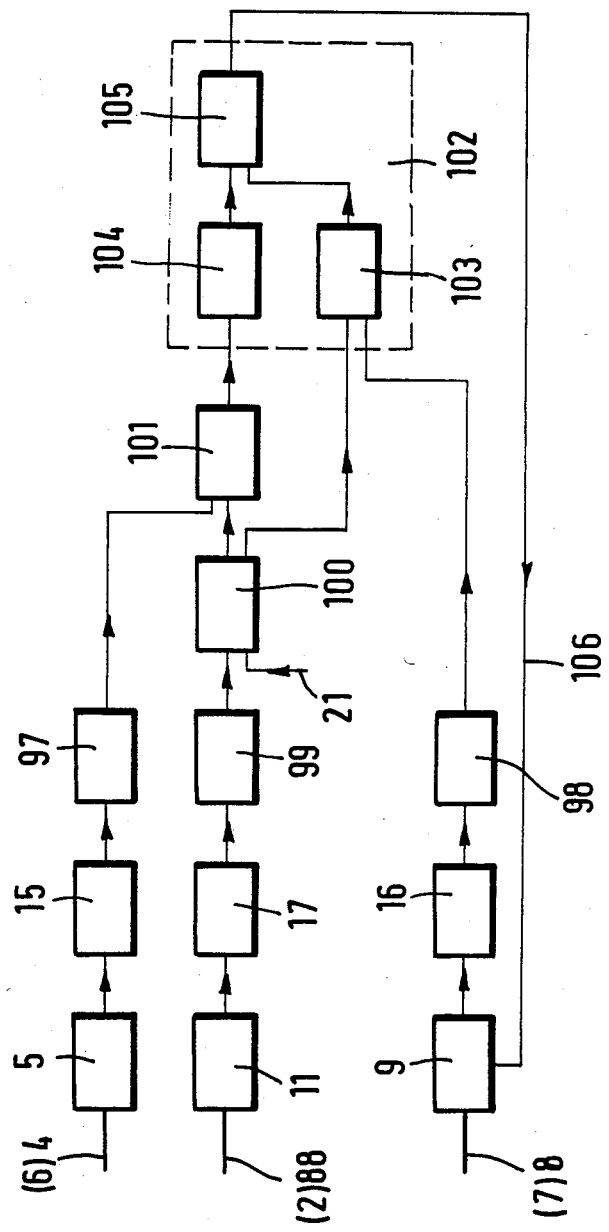
Figure 8:
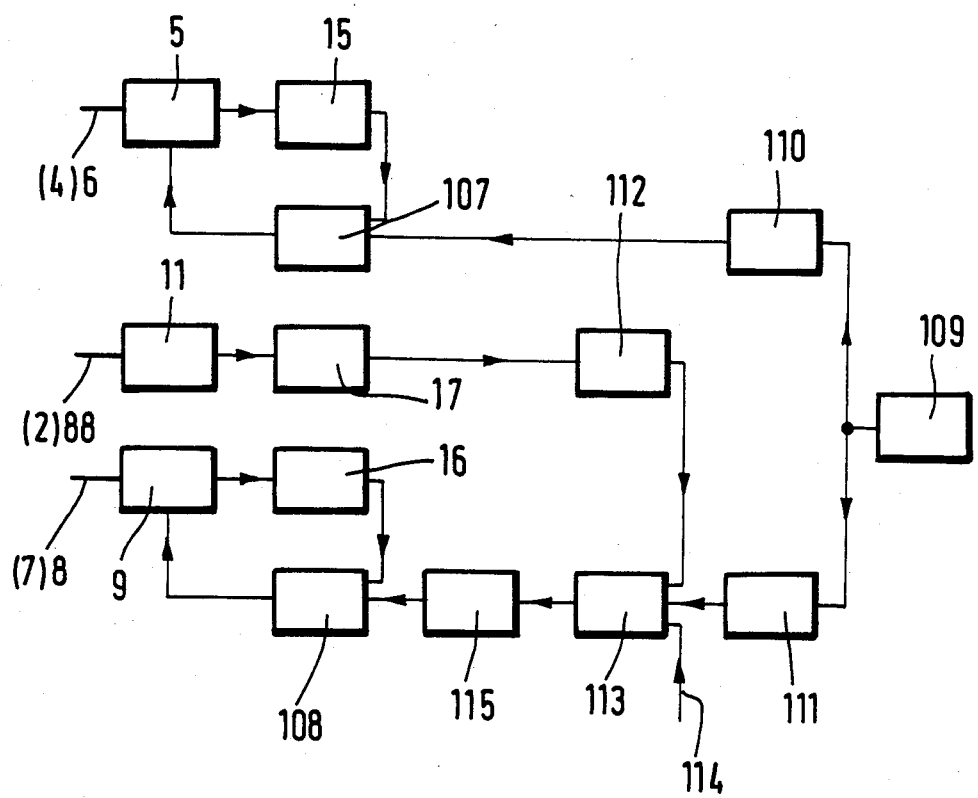

In the illustrative embodiment according to FIG. 7, the resolutions of the signals supplied by the pulse transmitters 15 and 16 of the motors 5 and 9 are made equal to each other in subsequent matching devices 97 and 98. In a subsequent matching device 99, the resolution of the signal supplied by the pulse transmitter 17 of the motor 11 is made greater by a factor K, which is necessary for a meaningful resolution of the overall system and which can be, for example, equal to 50 times the resolution of the signals present at the output of the matching devices 97 and 98. The matching device 99 is followed by a counter 100 which transmits each K-th pulse to an adder 101. The adder 101 is also supplied with the pulses supplied by the matching device 97 which are mixed with, that is to say added to or subtracted from, the pulses supplied by the adder 100. The adder 101 is followed by a phase meter 102 which is supplied with the output signals of the adder 101 and the matching device 98. In the phase meter 102 a phase measurement is carried out in a phase measuring element 104 between the signals supplied by the adder 101 and the matching device 98. At the output of this phase measuring element 104, the required signal is present but at a measurement value resolution which is equal to the number of the pulses per revolution of the workpiece 7 present at the output of the matching device 98. Naturally, this resolution is too coarse and it is therefore brought to a suitable value.

For this purpose, the counter 100 is provided with a second output via which the respective count is conducted to a digital/analog converter 103 of the phase meter 102. The counter 100 is constructed in such a manner that it is set to zero after K input pulses in each case. The consequence is that a sawtooth-shaped voltage variation is produced at the output of the digital/analog converter 103 with a constant pulse repetition frequency at the input of the counter 100, the voltage dropping in each case to zero when the counter 100 is set to zero. The amplitude of the voltage curve corresponds to the distance between adjacent pulses at the output of the matching device 97, that is to say to the resolution of the measurement value at the output of the phase measuring element 104. The resolution at the output of the digital/analog converter 103 is higher by a factor of K. The signals at the output of the phase measuring element 104 and of the digital/analog converter 103 are combined, that is to say added or subtracted, in an adder 105 of the phase meter 102. Thus, the required measurement value is present with a sufficiently fine resolution at the output of the adder 105. It can be utilized via line 106 for controlling the motor 9 for rotating the workpiece 7.

Other pulses which are intended for influencing the additional movement can also be fed to counter 100 via input 21 and thus used for controlling the motor 9.

In the illustrative embodiment according to FIG. 8, the motors 5 and 9 again generate the basic movement of the tool 6 and of the workpiece 7. In the illustrative embodiment shown, the workpiece 7 with the motor 9 is considered as reference element. In the pulse transmitters 15 and 16, the pulse sequences corresponding to the basic movement are again generated which are compared in subsequent phase comparators 107 and 108 with the phase relationship of signals which are supplied by a generator 109. The pulse sequences supplied by the generator 109 are matched, that is to say made equal to each other in resolution, with known means in subsequent matching devices 110, 111 and 115 to setpoints of the movement of elements 4 and 8. The phase shift required for superimposing the additional movement on the workpiece 7 is generated by the resolution of the signal supplied by the pulse transmitter 17 of the motor 11 being made equal to the resolution of the signal supplied by the generator 109 in a matching device 113 following the pulse transmitter and in the matching device 111, respectively, this resolution being higher by a factor of K than the resolution of the element 16. The signals present at the outputs of the matching device 111 and 112 are supplied to an adder 113 in which the signals are combined. Other pulses which are possibly intended to influence the additional movement of the workpiece 7 are supplied via a further input 114 to the adder 113 and combined in the latter with the other signals. The resolution of the signal present at the output of the adder 113 is divided down by a factor of K in a subsequent matching device 115 and is thus supplied as setpoint for the movement of the motor 9 to the phase comparator 108. This set point is compared with the signal supplied by the pulse transmitter 16a. The output signal of the phase comparator 108 is the measurement value which is used, if necessary, for controlling the motor 9.

What is claimed is:

1. A method, comprising:
   moving a main guide element of a machine tool to produce a first basic movement;

moving a reference element of said machine tool to execute a second basic movement at a predetermined ratio to the movement of said main guide element;

deriving pulse sequences from said main guide element and said reference element, said pulse sequences having the same frequency and having a phase relationship indicative of the relative positions of said main guide element and said reference element;

superimposing on at least one of said pulse sequences a phase shift indicative of an additional movement to be carried out by said reference element at a speed which is slow relative to the speed of said basic movements in order to produce a phase shifted pulse sequence;

comparing the phase of the phase shifted pulse sequence with the pulse sequence not having a superimposed phase shift to produce a phase shift resolution signal which is indicative of a movement which is finer than the movement indicated by the distance between adjacent pulses of said derived pulse sequences.

2. The method of claim 1 further including controlling the movement of the reference element using said phase shift resolution signal.

3. The method of claim 1 wherein the step of superimposing comprises:
deriving a further pulse sequence from a further guide element;
modifying the pulse sequence from the main guide element such that the pulse spacing is K times as great as the spacing of the pulses derived from said reference element;
combining the pulse sequence from said further guide element with the modified pulse sequence from the main guide element; and
dividing said combined pulse sequence by a factor of K to produce said phase shifted pulse sequence.

4. A method according to claim 3 wherein the comparing step comprises comparing the phase shifted pulse sequence with the pulse sequence derived from the movement of the reference element.

5. A method, comprising:
forming a first pulse sequence representing desired movement of a main guide element of a machine tool;
forming a second pulse sequence representing desired movement of a second guide element of said machine tool;
forming a third pulse sequence representing actual movement of a reference element of said machine tool, said first and second pulse sequences being equal in resolution and having a resolution which is substantially higher than the resolution of said third pulse sequence;
combining said first and second pulse sequences for controlling movement of said reference element;
using said first pulse sequence for controlling movement of said main guide element; and
using said second pulse sequence for controlling movement of said second guide element.

6. A method according to claim 5 including the steps of:
generating a fourth pulse sequence indicative of the actual movement of said main guide element;
comparing said fourth pulse sequence with said first pulse sequence for producing a control signal for controlling movement of said main guide element;
generating a fifth pulse sequence indicative of actual movement of said second guide element; and
comparing said fifth pulse sequence with said second pulse sequence for producing a control signal for controlling movement of said second guide element.

7. A method, comprising:
moving a main guide element of a machine tool to produce a first basic movement;
producing a first pulse sequence representing the actual movement of said main guide element;
moving a reference element;
producing a second pulse sequence representative of the movement of said reference element;
comparing said second pulse sequence with said first pulse sequence to control said reference element to produce a second basic movement which is at a predetermined ratio to the basic movement of said main guide element;
moving a second guide element;
producing a third pulse sequence representative of the actual movement of said second guide element;
superimposing an additional movement on said reference element dependent on said third pulse sequence by physically moving said reference element to produce a phase difference between the actual position of said reference element and the position indicated by said second pulse sequence.

8. A method according to claim 1 wherein the step of superimposing comprises deriving a high resolution pulse sequence having a resolution which is greater by a factor of K than the resolution of said pulse sequences derived from said main guide element and said reference element, combining each Kth pulse of said high resolution pulse sequence with pulses of said at least one pulse sequence to produce said phase shifted pulse sequence; and wherein the step of comparing further includes increasing the resolution of said phase shift resolution signal by superimposing a correction signal onto said phase shift resolution signal, said correction signal being derived from said high resolution signal and having an approximate sawtooth shape and a duration which is commensurate with the resolution of said phase shift resolution signal.

9. The method according to claim 5 wherein said first pulse sequence represents a basic movement to be executed by said reference element and said second pulse sequence represents an additional, smaller movement to be executed by said reference element, said first and second pulse sequences having a resolution which is K times greater than said third pulse sequence; dividing said combined pulse sequence by K; comparing said divided pulse sequence with said third pulse sequence to produce a comparison signal; and using said comparison signal to control movement of said reference element.

10. An apparatus, comprising:
a first drive mechanism for moving a main guide element of a machine tool to produce a first basic movement;
a second drive mechanism for moving a reference element of said machine tool to execute a second basic movement at a predetermined ratio to the first basic movement;
a first signal transmitter for producing a signal indicative of movement of said main guide element;

a second signal transmitter for producing a second signal indicative of movement of said reference element;

phase comparator means for comparing the phase of said first signal with the phase of said second signal to produce a phase comparison signal for controlling one of said drive mechanisms;

means for initiating additional movement of one of said elements, the signal transmitter for transmitting a signal indicative of the movement of said one of said elements comprising a scanning device and a signal scale, said additional movement initiating means being connected to produce relative movement between said scanning device and said signal scale.

11. The device according to claim 10 wherein the signal transmitter for transmitting a signal indicative of movement of the one of said elements is a shaft angle encoder, the scanning device and signal scale of which are received in a housing, said housing being connected for rotation by said additional movement initiating means, and further including an additional signal transmitter for detection of the housing movement.

12. The device according to claim 11 wherein said additional signal transmitter has an output connected to a first input of a comparator, said comparator having a second input receiving a setpoint signal indicative of desired movement of said housing, said comparator having an output connected to said further drive mechanism for controlling said further drive mechanism, said additional signal transmitter comprising a shaft angle encoder having a pulse scale connected to said rotatable housing.

13. The device according to claim 10 wherein said additional movement initiating means comprises a further guide element, means for moving said further guide element, a further signal transmitter for producing a signal indicative of movement of said further guide element, means for matching the resolution of the signals from said first signal transmitter and said further signal transmitter; and means for combining said matched resolution signals to produce a combined signal; and further including means for matching the resolution of said combined signal to the resolution of said signal produced by said second signal transmitter.

14. The device according to claim 13 wherein said means for matching the resolution of said first signal transmitter and of said further signal transmitter comprises a multiplier for multiplying the signal from said first signal transmitter, said means for combining comprises an adder; and said means for matching the resolution of said phase shifted pulse train to the resolution of said signal from said second pulse transmitter comprises a divider.

15. A device, comprising:
a main guide element;
a reference element;
means for moving said main guide element with a first basic motion;
first signal transmitter means for producing a signal indicative of the first basic movement of said main guide element;
means for moving said reference element with a second basic movement at a predetermined ratio relative to said first basic movement;
second signal transmitter means for producing a signal indicative of the second basic movement; and means for imparting an additional movement to one of said elements, comprising a further drive means connected to said one of said elements for physically moving said one of said elements, a further signal transmitter means for producing a signal indicative of said additional movement, a comparator having a first input for receiving said signal indicative of said additional movement and having a second input for receiving a setpoint signal, said comparator having an output producing a comparison signal for controlling said additional movement.

16. The device according to claim 15 wherein said one of said elements is said reference element, said means for moving said reference element comprises a drive shaft and a gear set comprising a first gear mounted on said drive shaft, and said further drive means comprises a screw guide element interposed between said first gear and said drive shaft, said screw guide element being rotatable with said drive shaft and having an outer threaded surface mating with an inner threaded surface on said first gear, and means for moving said screw guide element axially along said shaft while said screw guide element rotates with said shaft to produce additional rotation of said first gear.

17. The device according to claim 16 wherein said means for moving said screw guide element axially comprises a threaded spindle connected to said screw guide element for moving said screw guide element axially of said shaft, a gear operatively connected to said threaded spindle for moving said threaded spindle, and means for rotating said gear.

18. The device according to claim 15 wherein said means for moving said main guide element comprises a drive mechanism and a gear set connecting said drive mechanism to said main guide element.

19. A device, comprising:
a main guide element;
a reference element;
means for moving said main guide element to produce a first basic movement, comprising a first drive mechanism for driving said main guide element is response to a first drive signal, a first signal transmitter for producing a signal indicative of movement of said main drive element, and a first comparator for comparing said signal from said first signal transmitter to a setpoint signal for producing said first drive signal;
means for moving said reference element to produce a second basic movement at a predetermined ratio to said first basic movement, comprising a second drive mechanism for driving said reference element, a second signal transmitter for producing a signal indicative of the movement of said reference element, and a second comparator for comparing said signal from said second signal transmitter to a second setpoint signal;
signal generator means for producing said first and second setpoint signals; and
means for initiating an additional movement of said reference element comprising means for adding an additional movement signal to said second setpoint signal.

20. The device according to claim 19 further including means for matching the resolutions of said set point signals to the resolutions of said signals from said signal transmitters.

21. The device according to claim 20 wherein said resolution matching means are followed by dividers.

22. The device according to claim 19 wherein the output of said means for adding is received by a means for matching the resolution of the added signal to the signal from said second signal transmitter.

23. The device according to claim 19 wherein the outputs of said comparators are used to control said drive mechanisms, respectively.

24. A device, comprising:
a main guide element;
a reference element;
a second guide element;
first signal transmitter means for producing a signal indicative of movement of said main guide element;
second signal transmitter means for producing a signal indicative of movement of said reference element;
third signal transmitter means for producing a signal indicative of movement of said second guide element;
means for adding the signals from said first and third signal transmitters to produce an added signal;
means for comparing the phase of said added signal with the phase of the signal from said second signal transmitter to produce a comparison signal; and
means for increasing the resolution of said comparison signal in response to the signal from said third signal transmitter.

25. The device according to claim 24, wherein said signal from said third signal transmitter comprises a pulse signal, and said resolution increasing means comprises a counter for counting pulses of said pulse signal, a digital to analog converter for converting the count of said counter to an analog signal, and means for adding said analog signal to said phase comparison signal.

* * * * *